United States Patent [19]

Vanderpool et al.

[11] 4,395,278
[45] Jul. 26, 1983

[54] METHOD FOR PRODUCING COBALT METAL POWDER

[75] Inventors: Clarence D. Vanderpool; Richard A. Scheithauer; Richard G. W. Gingerich, all of Towanda, Pa.

[73] Assignee: GTE Products Corporation, Stamford, Conn.

[21] Appl. No.: 191,882

[22] Filed: Sep. 29, 1980

[51] Int. Cl.³ .............................................. C22B 23/04
[52] U.S. Cl. ............................. 75/0.5 AA; 75/0.5 BA; 423/592
[58] Field of Search ............ 75/0.5 R, 0.5 A, 0.5 AA, 75/0.5 B, 0.5 BA, 103, 119; 423/140, 141, 143, 144, 145, 413, 592

[56] References Cited

U.S. PATENT DOCUMENTS

| | | | |
|---|---|---|---|
| 2,734,821 | 2/1956 | Schaufelberger | 75/119 |
| 4,180,555 | 12/1979 | Bamberger et al. | 423/592 |
| 4,208,380 | 6/1980 | Hämäläinen et al. | 423/592 |
| 4,214,240 | 9/1980 | Gingerich et al. | 75/0.5 AA |
| 4,214,895 | 7/1980 | Girgench et al. | 75/0.5 AA |

FOREIGN PATENT DOCUMENTS 55-62814  5/1980  Japan .................................. 423/592

*Primary Examiner*—Michael L. Lewis
*Attorney, Agent, or Firm*—Robert E. Walter

[57] ABSTRACT

Fine metal powder is produced from a wet cobaltic hydroxide precipitate by contacting the precipitate with steam to convert the precipitate to a cobaltous oxide and reducing the cobaltous oxide to produce a fine cobalt metal powder.

11 Claims, No Drawings

METHOD FOR PRODUCING COBALT METAL POWDER

CROSS REFERENCE TO RELATED APPLICATIONS

Co-pending applications relating to the production of fine metal cobalt include Ser. No. 38,973 relating to mother liquor treatment, Ser. No. 38,968 utilizing an ion exchange resin during cobalt liquor processing, Ser. No. 38,972 including an ammonia recycling step, Ser. No. 38,970 relating to producing cobaltic hexammine complex as an intermediate step, and Ser. No. 38,971 relating to the use of a metallic hydroxide to form a cobalt containing precipitate and Ser. No. 179,332, 9-18-80, relating to the formation of a cobalt precipitate by heading an aqueous solution of soluble cobaltic ammine halide to form the cobalt precipitate.

TECHNICAL FIELD

This invention relates to the production of fine cobalt metal powder from an impure cobalt source, and more particularly relates to the process for obtaining such powder by the hydrogen reduction of a precipitate obtained from an aqueous solution containing cobalt.

Fine cobalt powder of high purity is typically used in the manufacture of cemented carbide cutting tools, magnetic tapes, and magnetic inks.

BACKGROUND OF THE INVENTION

According to German Pat. No. 2,319,703, it is known to separate cobalt from nickel by a process which includes forming pentammine sulfate complexes of the two ions in solution. However, it has been found that soluble cobalt ammine sulfates can only be reduced while still in solution, under pressure, and with the aid of catalysts. Furthermore, the resulting cobalt powder is not fine particle size.

U.S. Pat. No. 4,093,450 to Doyle et al. describes a process for producing fine particle size cobalt metal powder by the hydrogen reduction of cobalt oxide obtained from a cobalt pentammine carbonate solution. The precipitate was formed by heating the solution to drive off ammonia and carbon dioxide to form a precipitate of cobalt oxide. This process requires a solution of approximately four grams per liter of cobalt to produce a metal powder having a particle size less than one micron. Note that the final resulting particle size is less than one micron is highly dependent on the concentration of cobalt employed in the aqueous solution.

U.S. Pat. No. 4,184,868 to Ritsko et al relates to a process for producing metal powder cobalt by forming a cobalt pentammine chloride solution, digesting the solution to form a black precipitate, and reducing the precipitate to form cobalt metal powder.

The following patents are directed to the separation of cobalt from other cations, especially nickel. The resulting cobalt compounds are not disclosed as being sources for forming fine particle size cobalt.

U.S. Pat. No. 2,879,137 to Bare et al. discloses the treatment of an ammoniacal ammonium carbonate solution obtained from leaching an ore and containing nickel wherein the cobalt present in the cobaltic state is treated with an alkali metal or alkaline earth metal hydroxide under controlled temperature conditions to precipitate the nickel free of cobalt.

U.S. Pat. No. 3,928,530 to Bakker et al. discloses a process for the separation of nickel and cobalt by forming pentammine chloride complexes in solution containing a high concentration of ammonium chloride, and precipitating cobalt pentammine chloride.

In German Pat. No. 1,583,864, cobalt is recovered from scrap by digestion of the scrap in HCl and $MgCl_2$ solution, followed by removal of iron and chromium impurities by precipitation at a moderately acid pH followed by extracting a cobalt chloride complex with a long chain tertiary ammine in an aromatic solvent.

U.S. Pat. No. 4,108,640 to Wallace discloses a process for recovering metallic cobalt from an aqueous ammoniacal solution wherein the solution is contacted with a water immiscible liquid ion exchange reagent dissolved in an inert organic diluent to selectively extract the other metal from the solution and produce an organic extract loaded with the other metals and an aqueous cobalt bearing raffinate substantially free of the other metals.

SUMMARY OF THE INVENTION

A problem encountered in the production of cobalt according to the method described in U.S. Pat. No. 4,184,868 discussed above is the production of hard tailings after reduction. Such tailings are larger particles than the desired fine powder and must be reprocessed. It is an object of the present invention to reduce the amount of tailings formed and hence increase the yield of fine metallic cobalt particles.

The process of the present invention can be used to effectively to form fine cobalt powder with controlled particle size independent of the particle size of the wet cobalt containing precipitate.

Other and further objects of the present invention will become apparent from the following description.

In accordance with the present invention, there is provided a method for producing a fine metal powder from a wet cobaltic hydroxide precipitate comprising contacting said wet cobaltic hydroxide precipitate with steam at a temperature greater than 800° C. for a sufficient period of time to convert said cobaltic hydroxide precipitate to cobaltous oxide and reducing said cobaltous oxide to produce a fine cobalt metal powder.

DETAILED DESCRIPTION

Fine particle size cobalt, typically having a Fisher Sub Sieve Size (FSSS) from about 0.5 to about 3.0, is produced directly by the reduction of a cobalt containing precipitate which is formed by heating an aqueous solution of a soluble cobaltic ammine halide. The cobalt containing precipitate may be formed from solutions having a wide range of cobaltic ammine halide concentration. Preferably the solution contains cobaltic ammine halide from about 5 grams per liter based on the weight of cobalt up to the limits of solubility of the cobaltic ammine halide. Cobaltic ammine halide is more preferably present in solution in an amount from about 5 grams to about 60 grams and more preferably from about 10 grams to about 50 grams based on the cobalt present in solution.

It is contemplated that the solution containing the soluble cobaltic ammine halide may be derived from a variety of sources. The purity of the resulting metallic cobalt is dependent on the purity of the starting solution in that certain metallic cations which may be regarded as impurities may precipitate with the cobalt and may be present in the final reduced cobalt metallic powder. The solution preferably consists essentially of aqueous cobaltic ammine halide and an acceptable amount of impurities.

It is generally preferred that the cation impurities be present in the solution in an amount less than about 2 percent by weight based on the amount of cobalt present in the solution. Typical cation impurities include iron, manganese, copper, aluminum, chromium, magnesium, calcium, etc. For the preparation of cobalt powders to be used in the cemented carbide industry, it is preferable that the cation impurity of the solution be less than about 0.2 percent by weight based on the cobalt present in solution.

Typical solutions containing cobalt which may be utilized in the present invention may be derived from sludges and leach solutions from cemented carbide or tungsten recovery operations. For those solutions containing the cobaltous ion, oxidation to the cobaltic ion is preferable to result in improved recovery.

According to one process, a cobalt source containing various impurities is digested in hydrochloric acid solution to obtain a solution of about 60 to 150 grams per liter of cobalt in a 1 to 6 molar hydrochloric acid solution. Ammonium hydroxide is added to result in a concentration of about 100 to 150 grams per liter of ammonium chloride at a pH of about 9.0 to 10.0. Air oxidation of the cobaltous ion to cobaltic results in the formation of cobaltic ammine ions. At least a portion of the cobaltic ammine ions are preferably present in the form of cobaltic hexammine and halocobaltic pentammine having the formula $Co(NH_3)_6{+}{+}{+}$ and $Co(NH_3)_5 X{+}{+}$ wherein X is a halogen or hydroxide.

It is preferable to reduce the cation impurities by further purification of the solution. According to one such method, a solution which has been formed by the digestion of the cobalt source in hydrochloric acid according to the above method and containing cobalt ammine ions may be treated with a sufficient amount of hydrochloric acid to reduce the pH to less than about 1.0 to precipitate chloropentamminecobalt(III) dichloride and hexaminecobalt(III) trichloride. Filtration of the solution results in the precipitated cobalt ammine halides being separated from the acid solution containing soluble cation impurities.

The crude cobalt ammine halide precipitate may be further purified by subsequent crystallizations wherein the cobaltic ammine halide precipitate is first dissolved in ammonium hydroxide solution, next, acidified to produce a cobaltic ammine precipitate, and then is separated from the liquor containing impurities. The cobaltic ammine halide precipitate halide is redissolved to form a solution of increased purity.

Next, a cobalt containing precipitate is produced from the solution of cobaltic ammine halide. According to U.S. Pat. No. 4,184,868, the cobaltic amine halide solution is digested for about 2 to about 10 hours at a temperature of from about 80° to about 100° C. to form a wet cobalt oxide hydrate precipitate which is separated from the solution and subsequently reduced. According to U.S. Pat. No. 4,218,240, issued Aug. 19, 1980 the wet cobalt containing precipitate is produced from an aqueous ammine halide solution by treating the solution with an alkali metal hydroxide. According to U.S. (Ser. No. 179,332, filed Aug. 18, 1980) an aqueous solution of soluble cobaltic ammine halide is digested by heating to a temperature of at least about 120 degrees centigrade to decompose the cobaltic ammine halide to form the wet cobalt containing precipitate. U.S. Pat. No. 4,218,240, issued Aug. 19, 1980 describes the production of cobaltic hexammine chloride solution prior to treatment with an alkali metal hydroxide to form the cobalt containing precipitate.

The wet cobalt containing precipitate is believed to be an amorphous hydrated cobaltic compound referred to as a cobaltic hydroxide precipitate. The precipitate preferably has a black coloration and may have a nonuniform consistency. X-ray analysis of dried cobalt containing precipitate revealed the presence of at least the following three materials: $Co(OH)_3$; $Co\,O(OH)$; and $Co_3O_4$.

The cobalt containing precipitate may be separated from the aqueous solution and heated in a reducing atmosphere for a time and temperature sufficient to reduce the wet cobalt containing precipitate to cobalt metal powder. Such a reduction is usually carried out in a hydrogen atmosphere for a period of time of about 1 to about 6 hours at a temperature of from about 300° C. to about 600° C.

The resulting powder is separated into portions by screening. The portion remaining on the screening surface which is oversized is called tailings and is unsuited for use as fine cobalt powder. Any process which reduces the amount of tailings or enhances the control of cobalt powder size may be beneficial since the yield of cobalt powder of a particular size may be obtained.

According to the process of the present invention, the wet cobalt containing precipitate is converted to a cobaltous oxide prior to reduction. Since the size of the final cobalt metal powder is consistently dependent on the size of the intermediate cobaltous oxide, the final size of cobalt metal may be controlled by controlling the size of the intermediate cobaltous oxide. In prior art process where the wet cobaltic containing precipitate is directly reduced, variations in the size of the final cobalt may occur. The process of U.S. Pat. No. 4,184,868 may produce an undesirable amount of tailings. Although the process as described in U.S. Pat. No. 4,214,895, issued July 29, 1980; U.S. Pat. No. 4,218,240, issued Aug. 19, 1980 and (Ser. No. 179,332, filed Aug. 18, 1980) reduce the amount of tailings it is still desirable to obtain more control over the particle size of the cobalt powder. It is difficult to alter the size of final cobalt metal powder due to its ductility of the cobalt.

According to the principles of the present invention, the wet cobaltic hydroxide precipitate is contacted with steam at a temperature greater than about 800° C. for a sufficient period of time to convert said cobaltic hydroxide precipitate to cobaltous oxide. The cobaltous oxide produced preferably has a bulk density of from about 23 to about 25 grams per cubic inch and has a brownish coloration. Preferably the average particle size of the cobaltous oxide is from about 1 to about 6, preferably from about 2 to about 5 microns. It has been found that the reduction of cobalt oxide decreases the particle size so that the final cobalt powder has a particle size about one half the particle size of the starting cobaltous oxide. It is most preferable for the final cobalt metal powder to have a Fisher Sub Sieve Size of from about 1.2 to about 1.6 and be capable of passing through a No. 100 mesh screen. Thus it is most preferred for a cobaltous oxide to have an average particle size less than about 3 microns. The Fisher Sub Sieve Size is a method of measuring the average particle size and is based on the relation between the specific surface of packed particles and the air permeability of the particles.

The contacting of the cobaltic hydroxide precipitate with steam may be performed by passing steam around an open vessel containing the cobaltic hydroxide precipitate. The time period for the contacting varies according to the depth of the cobaltic hydroxide precipitate in the vessel. The steam contacting should be for a sufficient period to permit intimate contact of the steam with substantially all of the cobaltic hydroxide precipitate. The preferred temperature of steam is from about 900° C. to about 1000° C. temperatures below 900° C. may decrease the yield although temperatures on the order of 800° C. are operable. Temperatures over 1000° C. result in an uneconomical energy consumption without any significant increase in yield.

The following example will further illustrate the specified embodiments of this invention. It should be understood, however, that these examples are given by way of illustration in that limitation. All temperatures are in degrees centigrade and all parts are by weight, unless otherwise indicated.

EXAMPLE

PREPARATION OF COBALT CONTAINING PRECIPITATE

A wet cobalt containing precipitate is prepared according to the procedure set forth in U.S. Pat. No. 4,218,240 to Gingerich et al. In general, the metal comprises complexing cobalt ions present in an aqueous solution with ammonium in the presence of a catalyst to form a cobaltic hexammine ion, treating the solution in the presence of halide ions to form a cobaltic hexammine halide precipitate, removing the precipitate from the solution and impurities, dissolving the precipitate to form a relatively pure solution, and treating the relatively pure solution with a sufficient amount of metallic hydroxide to form a cobaltic hydroxide. The disclosure of U.S. Pat. No. 4,218,240 is incorporated by reference into the disclosure of the present application. It is contemplated that the cobalt containing precipitate may be formed by any of the methods described in U.S. Pat. No. 4,214,895, filed July 29, 1980 and U.S. Pat. No. 4,184,868 which disclosures are incorporated by reference into the disclosure of the present invention.

REDUCTION OF COBALT CONTAINING PRECIPITATE

About 30 grams of wet cobalt containing precipitate is loaded into a boat. The boat is placed in a furnace and steam at a temperature of 900 degrees is passed over and around the boat for about four hours. The boat was withdrawn from the furnace and cooled. It was observed that the color of the material in the boat had changed from an initial black to a brownish color. The material was analyzed as CoO having a Fisher Sub Sieve Size of about 4.19 and bulk density of 24.3. The one lot of the material was reduced in a hydrogen atmosphere for about four hours to yield a cobalt metal powder having a Fisher Sub Sieve Size of about 1.55. About 2 percent tailings remained on the screen. Since this size is greater than the most preferred size, another lot of the material is loaded into a ball mill having carbide balls and polyethylene lining to minimize contamination. The material was milled for about 16 hours. The resulting material has a Fisher Sub Sieve of about 1.80. This material is reduced in a hydrogen atmosphere as set forth above to yield a cobalt metal powder with a Fisher Sub Sieve Size of about 0.96 and no tailings.

While preferred embodiments of this invention have been described and illustrated, it is to be recognized that modifications and variations thereof may be made without departing from the spirit and scope of this invention as described in the appended claims.

INDUSTRIAL APPLICABILITY

The method described and claimed herein is particularly useful in the formation of extra fine particle size cobalt powders of high purity, which is useful, for example, as a starting material in the formation of cemented carbides.

We claim:

1. A process for producing a fine cobalt metal powder from an aqueous cobaltic ammine chloride solution comprising treating said aqueous cobaltic ammine chloride solution with an alkali metal hydroxide to form a wet cobaltic hydrated precipitate, contacting said wet cobaltic hydrated precipitate with steam at a temperature greater than about 800° C. for sufficient period of time to convert said cobaltic hydrated precipitate to cobaltous oxide and reducing said cobaltous oxide to produce a fine cobalt metal powder.

2. A process according to claim 1 for producing a final cobalt metal powder wherein said contacting time is from about 3 to about 25 hours.

3. A process according to claim 2 wherein said cobaltic ammine chloride comprises cobaltic hexammine halide and cobaltic pentammine halide and mixtures thereof.

4. A process according to claim 2 wherein said aqueous solution consist essentially of from about 5 grams per liter cobaltic ammine chloride based on cobalt present in solution up to the limits of solubility of cobaltic ammine halide, water, and less than about 2 percent by weight impurities based on cobalt present in solution.

5. A process according to claim 2 wherein said cobaltic oxide prior to reduction has an average particle size of from about 1 to about 6 microns.

6. A process according to claim 5 wherein said cobaltic oxide prior to reduction has an average particle size of from about 2 to about 5 microns.

7. A process according to claim 2 wherein said cobaltous oxide after contacting with steam is comminuted prior to reduction.

8. A process according to claim 2 wherein said temperature is from about 900° C. to about 1000° C.

9. A process according to claim 2 wherein said cobaltous oxide has a density of from about 23 to about 25 grams per cubic inch.

10. A process according to claim 9 wherein said cobalt metal powder has a Fisher Sub Sieve Size of from about 1.2 to about 1.6.

11. A process according to claim 10 wherein substantially all of said cobalt metal powder passes through a 100 mesh screen.

* * * * *